United States Patent [19]

Hannah et al.

[11] Patent Number: 4,826,123
[45] Date of Patent: May 2, 1989

[54] ADJUSTABLE KEYBOARD SUPPORT

[75] Inventors: Bruce R. Hannah, Cold Spring, N.Y.; James B. Eldon, Barto, Pa.; Eric J. Armstrong, Pennsburg, Pa.; Harold A. Smith, Emmaus, Pa.; Philip J. Campbell, Bethlehem, Pa.

[73] Assignee: Knoll International, Inc., New York, N.Y.

[21] Appl. No.: 44,756

[22] Filed: May 1, 1987

Related U.S. Application Data

[63] Continuation of Ser. No. 494,810, May 16, 1983, abandoned.

[51] Int. Cl.4 .............................................. A47G 29/02
[52] U.S. Cl. .................................. 248/248; 248/281.1
[58] Field of Search ................. 248/248.1, 280.1, 648, 248/662, 670, 278, 279, 281.1, 345.1, 172

[56] References Cited

U.S. PATENT DOCUMENTS

| 213,775 | 4/1879 | Redman et al. | |
|---|---|---|---|
| 2,177,169 | 10/1939 | Brown | 248/172 X |
| 2,750,840 | 6/1956 | Sklarek | 248/345.1 X |
| 3,436,046 | 4/1969 | Valesha | 248/284 |
| 3,652,143 | 3/1972 | Wener | |
| 4,616,798 | 10/1986 | Smeenge et al. | 248/281.1 |
| 4,632,349 | 12/1986 | Anstey | 248/281.1 |

FOREIGN PATENT DOCUMENTS

576890  5/1976  Switzerland ....................... 248/284

Primary Examiner—Reinaldo P. Machado
Assistant Examiner—Sarah A. Lechok Eley
Attorney, Agent, or Firm—Thomas A. O'Rourke

[57] ABSTRACT

An adjustable keyboard support is disclosed constituted by a rear housing that pivotally supports one end of a parallel link mechanism. A front housing is carried by the other end of the parallel link mechanism, and pivotally supports a keyboard mounting plate. The parallel link mechanism permits upward and downward movement of the keyboard mounting plate without change in the tilt of that plate. A gas cylinder mechanism coupled to the front housing changes the vertical position of the same, and a slide plate adjustment mechanism provides forward and backward movement of the keyboard mounting plate.

10 Claims, 6 Drawing Sheets

ADJUSTABLE KEYBOARD SUPPORT

This is a continuation of application Ser. No. 494,810 filed on May 16, 1983, now abandoned.

BACKGROUND AND BRIEF DESCRIPTION OF THE INVENTION

This invention relates to an adjustable keyboard support and is particularly directed to providing an adjustable support for a computer keyboard that may be stored under a work surface and moved from beneath that surface to a working position at any convenient orientation of the keyboard desired by an operator.

Supports for adjustably positioning a separable keyboard are known. One is schematically described in "The New Work-Station" by John Pile in Interiors, Nov. 1982, pages 92, 93. The keyboard support disclosed in that article moves through a range of tilt to suit a user's needs and also moves up and down, independently of tilt angle, to bring the keyboard to a desired position. Mechanical linkages are shown in the schematic illustration in the article, and thus the user is required manually to move the keyboard support to all desired positions (raising and lowering). The present invention, on the other hand, utilizes a gas cylinder mechanism to provide the motive power in raising the keyboard support. Manual force is only required in the lowering of the keyboard support. Additionally, by utilizing a rear housing that is pivotally coupled to a slide pate that moves in and out on the underside of a work surface, in conjunction with a front housing that pivotally supports a keyboard mounting plate, with the front and rear housing being connected together by a parallel link mechanism that permits upward and downward movement of the keyboard mounting plate without change in the tilt of that plate, front and rear translational movement of the keyboard mounting plate and a change in the angular orientation thereof at any level of positioning of that mounting plate is achieved in the present invention.

The invention will be more completely understood by reference to the following detailed description, taken in conjunction with the appended drawings.

DETAILED DESCRIPTION

Figure 1:
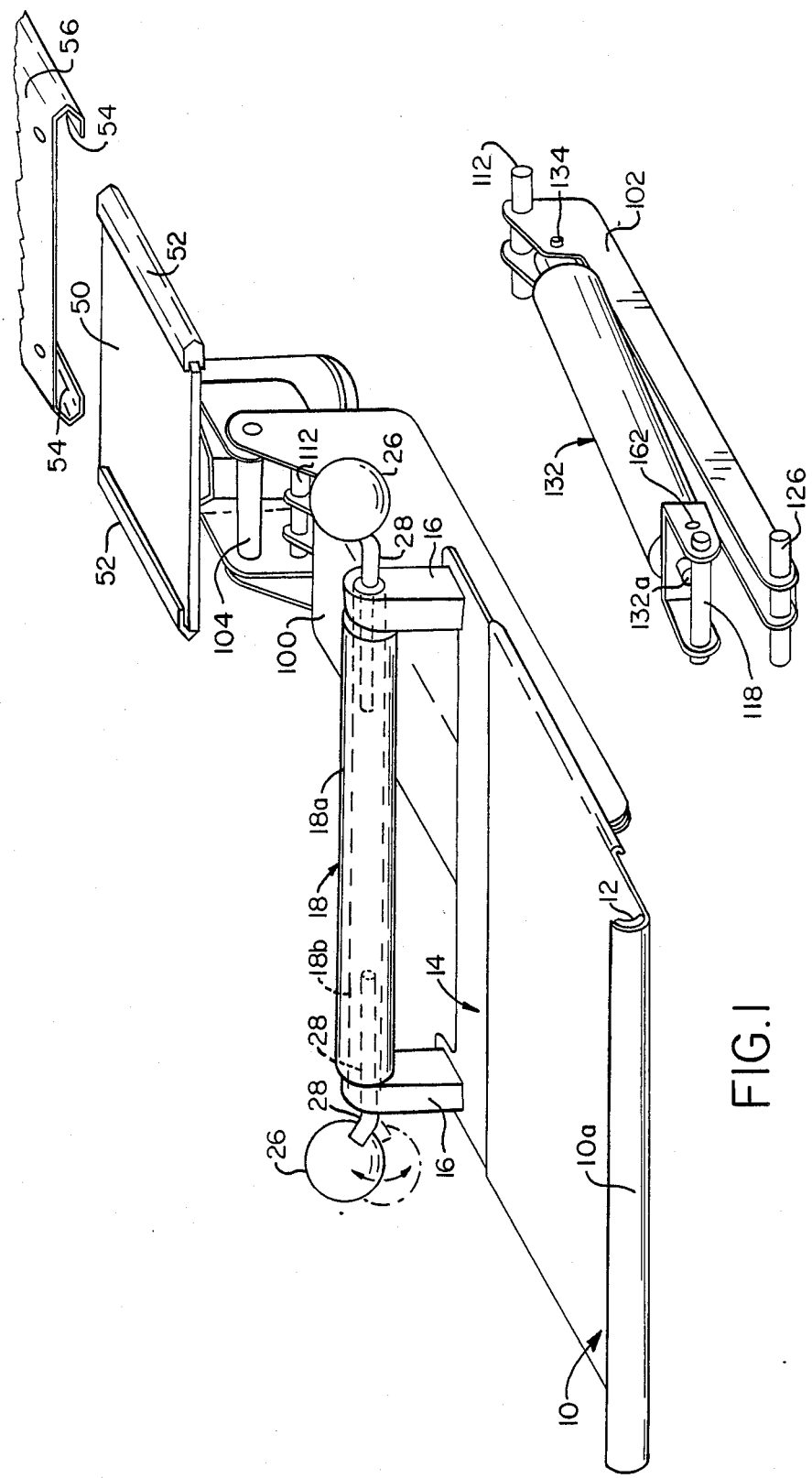
FIG. 1 is a perspective view, looking downwardly, of an adjustable keyboard support embodying the present invention.

Referring to FIG. 1, a universal keyboard mount is shown that is constituted by a keyboard mounting plate 10 having a curled end 10a that carries a cushion pad 12 thereon. The cushion pad 12 is adapted to cushion one surface of a keyboard (not shown). The keyboard mounting plate 10 is carried by a carrier 14 (see also FIG. 2). The carrier 14 includes upstanding posts 16 which mount a carrier cushioning section 18 therebetween. The carrier cushioning section 18 may be formed from a resilient roll 18a mounted about an innter tube 18b. The cushioning member 18 cushions a surface of the keyboard that is opposed to the surface that is cushioned by the cushioning section 12 of the keyboard mounting plate 10.

The keyboard mounting plate 10 and the carrier 14 are held against each other with relative adjustable positioning by means of studs 20 which depend from the underside of the keyboard mounting plate 10. The studs 20 pass through corresponding slots 22 in the carrier 14. Locking knobs 24 which thread onto the ends of the studs 20 are tightened to hold securely the mounting plate 10 against the carrier 14 in any particular position, and are loosened to permit relative movement of the two cushioning sections 12 and 18 toward and away from each other by appropriate movement of the studs 20 in the slots 22.

Bumpers 26 are included which preferably constitute resilient balls, each mounted upon one end of a rod 28 that is bent to define an obtuse angle. The other end of each rod is carried by the tubing 18b that forms a support for the resilient cushioning roll 18a. Each rod 28 is thus moveable along the axis of the tubing 18b, and is also pivotal about that axis, held in position by set screw 28a. Thus the resilient bumpers 26 may be moved toward and away from each other (in a direction generally transverse to that of the movement of the cushioning sections 12 and 18), and additionally (by virtue of the pivotal movement) in planes generally perpendicular to the direction of movement of the bumpers toward and away from each other. The bumpers accordingly have a freedom of movement along three orthogonal axes, and hence may be positioned as desired to protect various sized keyboards which may be mounted on the mounting plate against damage from impact with adjacent work surfaces as the mounting plate is moved.

The carrier 14 is advantageously mounted upon a support assembly 30 by means of a bracket 32 carried on the underside of the carrier 14. The bracket 32 is pinned to the assembly 30 by pin 34 (together with lock rings 36), and relative tilting of the carrier 14 (and concomitantly the keyboard mounting plate 10) is achieved by a tilt locking lever 38 which includes a threaded shaft 38a thereon which passes through slot 40 in bracket 32 and is threaded into a corresponding threaded hole 42 in the assembly 30. The locking lever 38 is loosened to permit appropriate tilting of the carrier 14, and this is tightened to maintain the tilt angle of the mounting plate 10.

The universal keyboard mount described above is an invention of Bruce R. Hannah, William I. Stephens, George Wilmot and Eric J. Armstrong, all inventors of a copending U.S. patent application for UNIVERSAL KEYBOARD MOUNT filed on the same date as this present application and carried under Docket KII-91.

Figure 5:
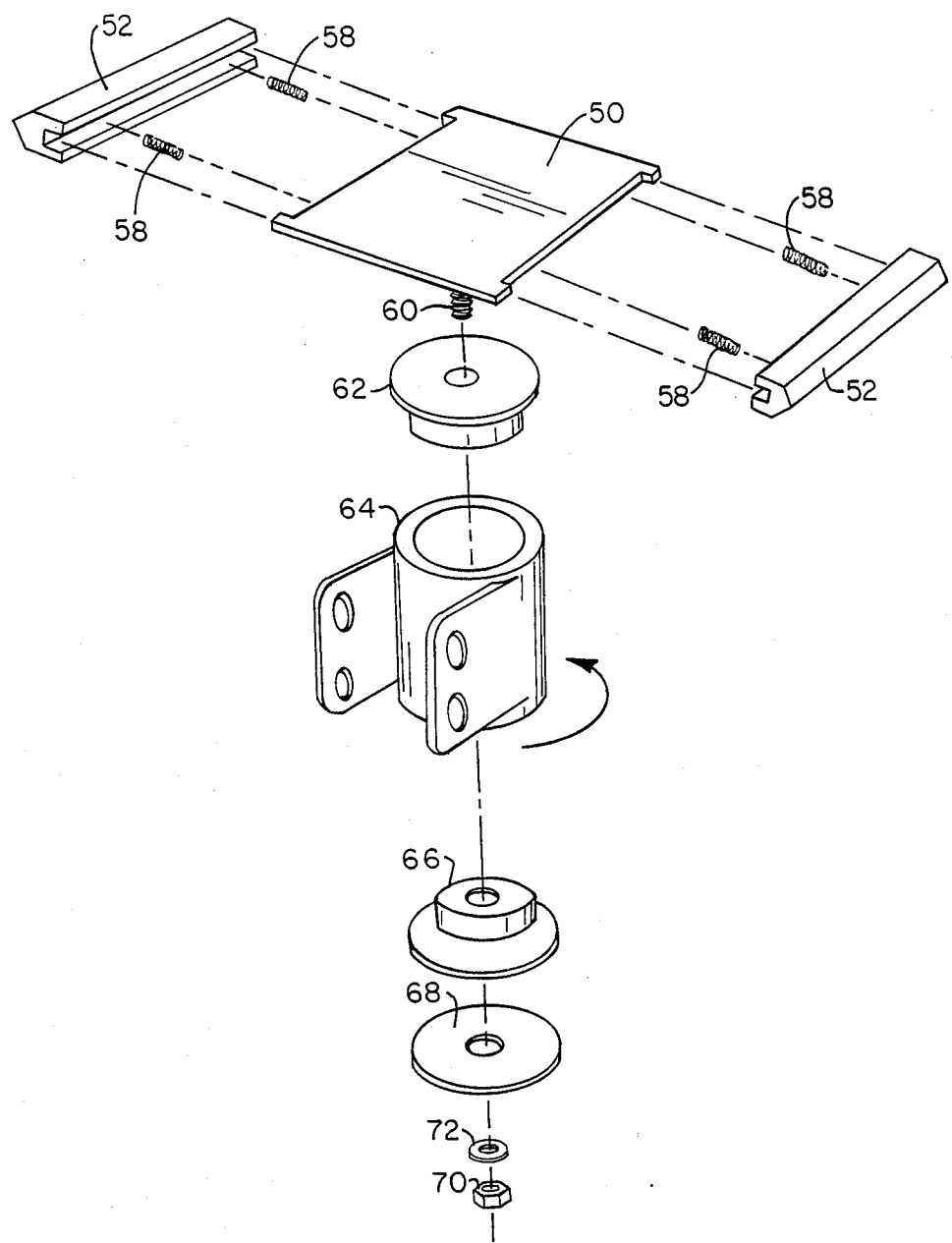
FIG. 5 is an exploded perspective view of a part of the adjustable keyboard support of FIG. 1, showing the details of a slide plate mechanism incorporated therein.

As shown in FIG. 1, the keyboard mounting plate 10 and the carrier 14 are coupled to a slide plate 50. The sides of the slide plate 50 include spring-loaded bearing blocks 52 that ride in slide tracks 54 of a track plate 56 that may be mounted to the underside of a work surface. The details of the slide plate 50 and the bearing blocks 52 are shown in FIG. 5. As noted in that figure, the sides of the plate 50 are cut out to accomodate the bearing block 52, and springs 58 provide the spring loading that urge the bearing blocks against the sides of the tracks 54.

The slide plate 50 and track plate 56 thus provide for movement of the keyboard mounting plate 10 forwardly and backwardly with respect to a work surface; Appropriate stops (not shown) may be included, if desired, to prevent the complete removal of the bearing blocks 52 out of the tracks 54.

As noted from FIG. 5, the underside of slide plate 50 includes a stud 60 affixed thereto that passes respectively through an upper bearing 62, a rear housing 64, a lower bearing 66, and a bearing plate 68, finally to be threaded onto nut 70 held by lock washer 72. The bearings 62 and 66 provide for pivotal movement of the rear housing with respect to the slide plate 50 about an axis which is generally perpendicular to that slide plate, for at least about 180° of pivotal movement and preferably for 360° of pivotal movement. The importance of this pivotal movement of the rear housing will be described in more detail below.

Figure 2:
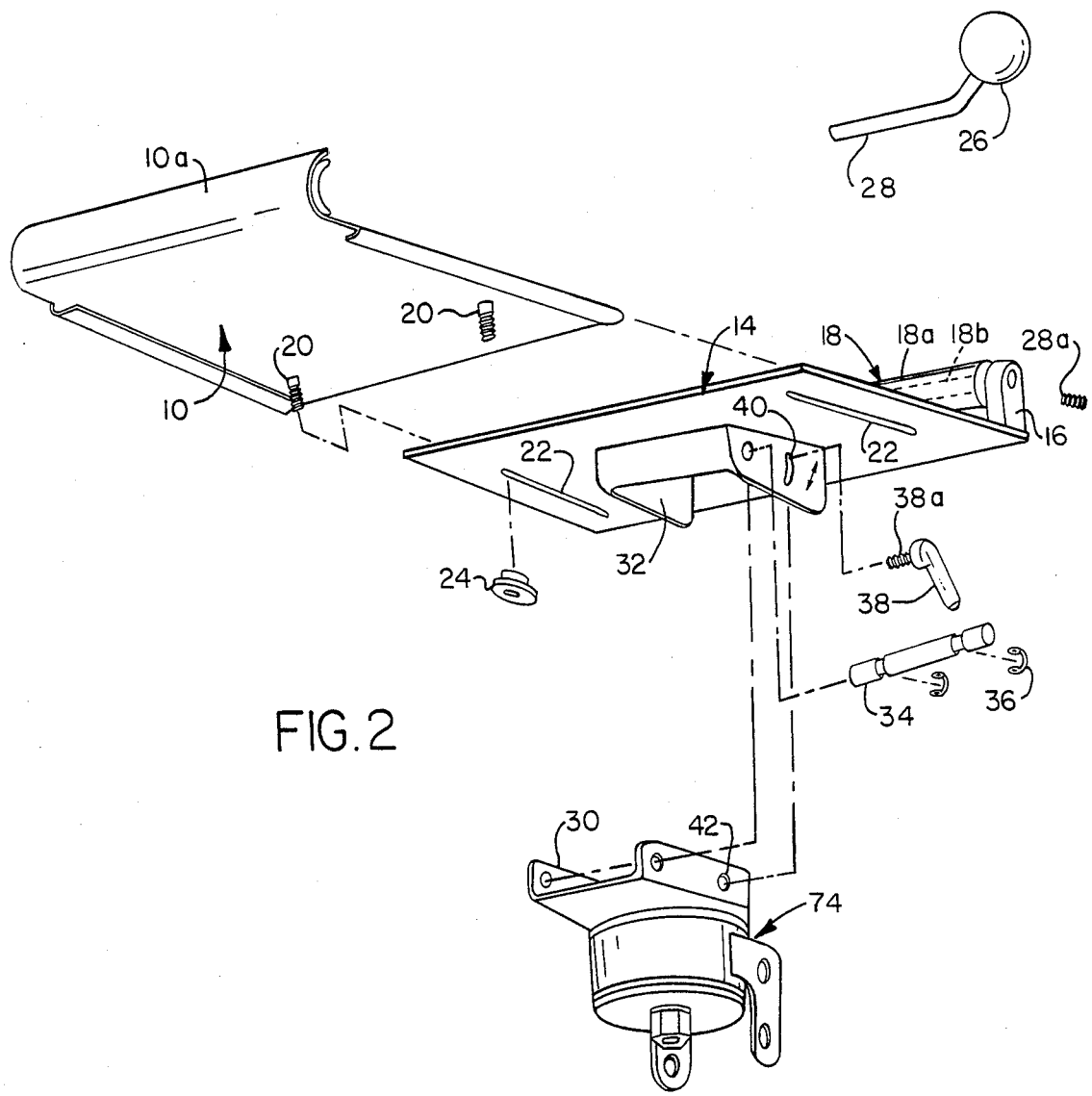
FIG. 2 is an exploded perspective view, looking upwardly, of a part of the keyboard support of FIG. 1.
Figure 3:
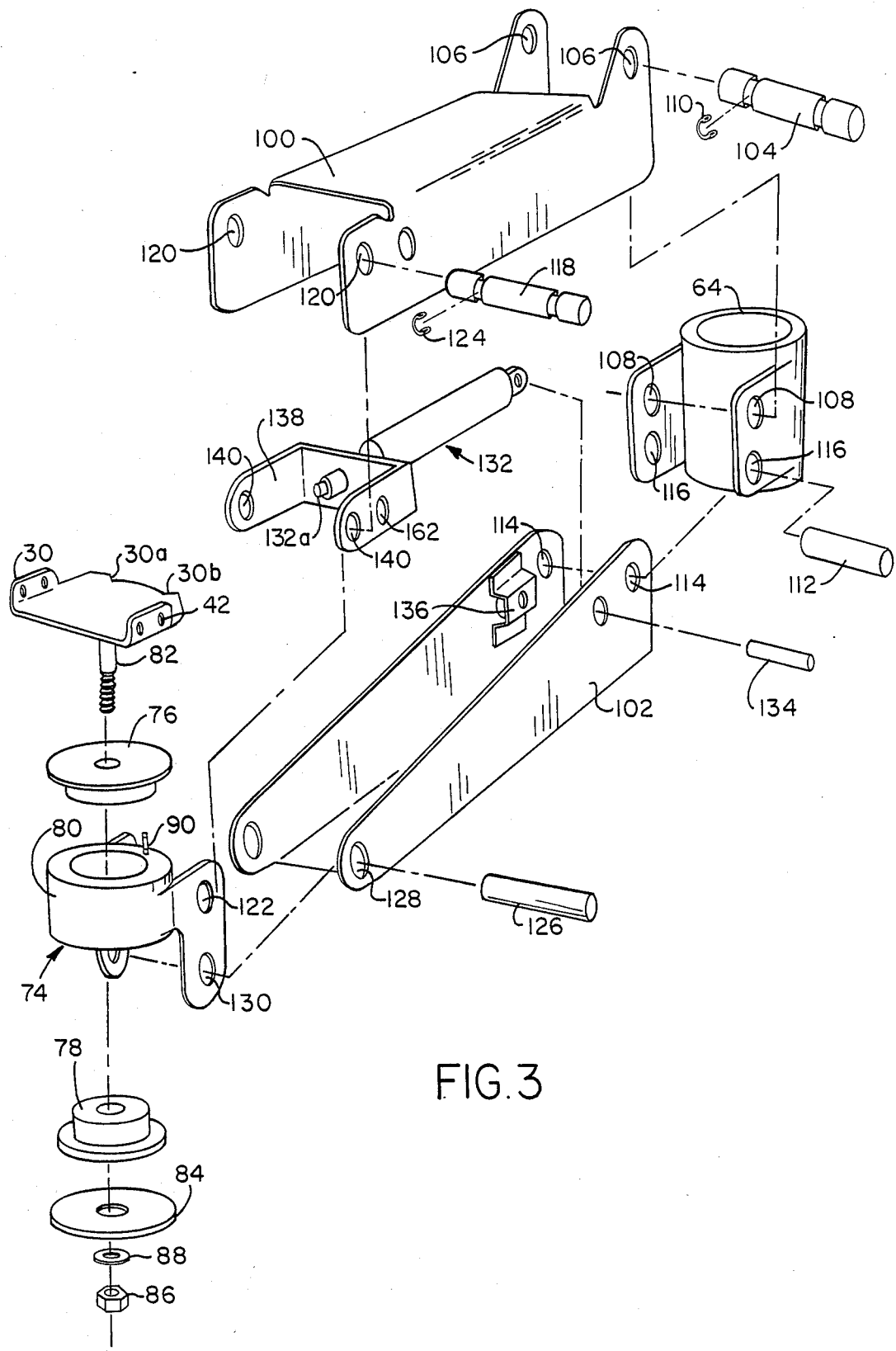
FIG. 3 is an exploded perspective view showing the details of a parallel link mechanism incorporated in the adjustable keyboard support of FIG. 1.

Referring to FIG. 2, it will be recalled that the keyboard mounting plate 10 is ultimately supported by assembly 30. That assembly 30 is in turn coupled to a front housing assembly 74, the details of which are shown in FIG. 3. Referring to that figure, the front housing assembly 74 includes, in addition to the support assembly 30, upper and lower bearings 76 and 78 on opposite sides of a front housing 80. The support assembly 30 includes a stud 82 which depends downwardly therefrom and passes through these bearings and front housing, in addition to a bearing plate 84 held by nut 86 and lock washer 88. The front housing 80 is thus free to pivot with respect to the support assembly 30. That pivotal movement is limited by a stop pin 90 that strikes ends 30a and 30b of a cut-away portion of the plate that constitutes the support assembly 30. The front housing 80 is thus free to pivot about an axis which is coextensive when the stud 82 for at least about 90° of movement about that axis. The axis of the stud 82 is parallel to the axis of pivotal movement of the rear housing 64 described above. Again, the significance of the pivoting movement of the front housing will be described in more detail below.

As shown in FIG. 3, a parallel link mechanism couples together the rear housing 64 and the front housing 80. Specifically, an upper arm 100 and a lower arm 102 constitute the two links of the parallel link mechanism. The upper arm 100 is pivotally coupled by a pivot pin 104 to the rear housing 64. The pivot 104 extends through holes 106 in the upper arm 100 and holes 108 in the rear housing 64, and is held in place by clips 110. Similarly, the lower arm 102 is pivotally coupled to the rear housing 64 by pin 112, which passes through holes 114 in the lower arm and holes 116 in the rear housing. The upper arm 100 is pivotally coupled to the front housing 80 by pin 118, which passes through holes 120 in the front portion of the upper arm 100 and upper holes 122 in the front housing 80. The pin 118 is maintained in place by clip 124. Similarly, the front end of the lower arm 102 is pivotally coupled to the front housing 80 by pin 126 which passes through holes 128 in the front of the lower arm 102 and lower holes 130 in the front housing 80. A gas cylinder mechanism 132 completes the coupling of rear housing 64 to front housing 80. Specifically, gas cylinder 132 is pivotally connected at one end thereof by pin 134 to a rear portion of the lower arm 102 adjacent to the holes 114. A centering structure 136 is included on both sides of the plates that constitute the sides of the lower arm 102 for the purpose of centering the gas cylinder between those plates. The front end of the gas cylinder 132 (the moveable piston in the gas cylinder) is coupled to a bracket 138. That bracket includes holes 140 therein through which the pin 118 passes. Thus, the moveable piston in the gas cylinder is coupled to the front housing 80 via the pin 118.

Figure 4:
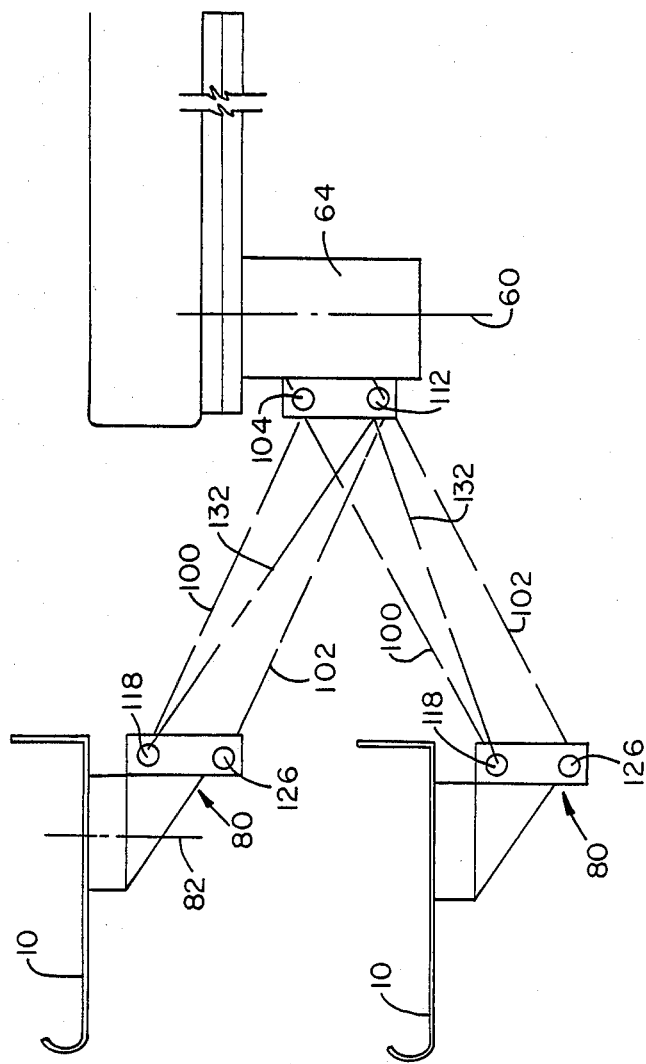
FIG. 4 is a schematic drawing illustrating the operation of the parallel link mechanism of FIG. 3.

The action of the mechanism coupling the rear housing 64 to the front housing 80 is best understood by reference to FIG. 4. The upper arm 100 and lower arm 102 form parallel links. There are two positions of the keyboard mounting plate 10 shown, namely, a high position and a low position. Because of the parallel links 100 and 102, and the pivotal connections provided by the pins 104, 112, 118, and 126, the tilt of the keyboard mounting plate 10 remains constant for all vertical positions of the front housing 80. This action occurs because the upper arm 100 and lower arm 102 form constant radii governing the arcuate movement of the pins 118 and 126 coupled to the front housing 80, pivoting about centers determined by the pins 104 and 112 in the rear housing 64.

Referring now to FIGS. 1 and 4 together, the significance of the various axes of pivotal movement of the rear housing 64 and the front housing 80 will now be perceived. The rear housing 64 pivots preferably 360° about the axis 60 (this is the axis of the same-numbered stud in FIG. 5). Thus the rear housing 64 is free to pivot about an axis which is generally perpendicular to the slide plate 50. When it is desired to store the keyboard mounting plate entirely underneath the work surface, the slide plate 50 may be moved to its rearwardmost position, and the rear housing 64 pivoted to the extent necessary to pivot the entire keyboard support plate assembly underneath the work surface. The pivotal movement of the front housing 80, on the other hand, about axis 82 (which is the axis of the stud 82 in FIG. 3) provides for pivotal movement of the front housing about an axis which is parallel to that of the pivotal movement of the rear housing 64. This pivotal movement of the front housing 80 is for the purpose of pivoting the keyboard mounting plate 10 to any desired position in use. Normally, only 90° of a pivoting movement of the front housing is required, and for this reason the stop pin 90 is included, as described above (with respect to FIG. 3). The two angular pivoting movements of the front and rear housings, together with the forward-/backward movement of the slide plate 50 provide the necessary movement of the keyboard mounting plate 10 to provide any positioning of that mounting plate desired by a computer operator.

Figure 6:
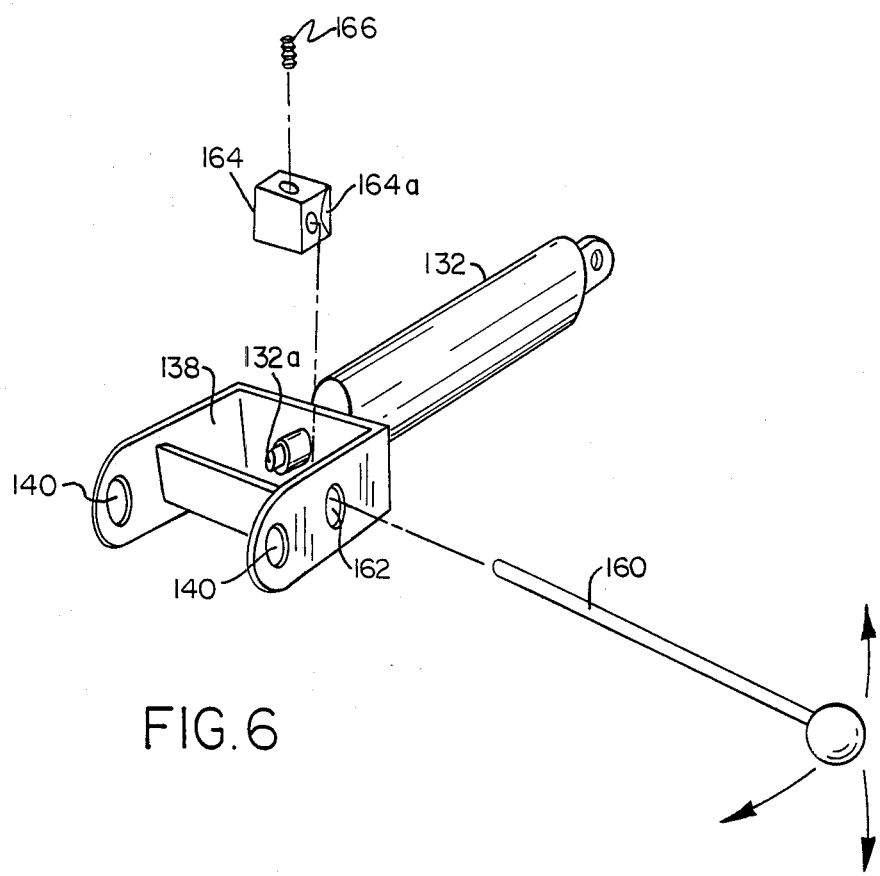
FIG. 6 is an exploded perspective view of a portion of the adjustable keyboard support of FIG. 1, showing the details of the gas cylinder actuating the structure.

The gas cylinder mechanism participates in the movement of the keyboard mounting plate 10 by providing for the raising and lowering of the front housing 80. With reference to FIG. 6, a gas cylinder activating rod 160 is included that passes through a hole 162 in the bracket 138. The activating rod 160 is fastened to a cam 164 by means of a set screw 166. Movement of the activating rod 160 moves the cam 164, which includes a dished surface 164a thereon that bears against activating button 132a of the gas cylinder. Appropriate movement of the activating rod 160 results in actuation of the gas cylinder activating button, in turn permitting the piston in the gas cylinder to move. When the keyboard mounting plate 10 is in the low position shown in FIG. 4, activation of the gas cylinder 132 results in the raising of the mounting plate by outward movement of the piston in the gas cylinder. On the other hand, when it is desired to lower the keyboard mounting plate 10, the gas cyliner is activated by appropriate manipulation of the activating rod 160, and manual force is used to lower the keyboard mounting plate 10 to the desired position.

By use of a gas cylinder mechanism, upward and downward movement of the keyboard mounting plate 10 is easily achieved. A cumbersome spring mechanism normally found in assemblies of this type is avoided by use of the gas cylinder mechanism, and manual force is only required in the lowering of the keyboard mounting plate, upward movement being carried out automatically by the gas cylinder mechanism. The pivotal movement of the front and rear housings in connection with the sliding movement of the slide plate together provide for accurate positioning of the keyboard mounting plate any number of unlited positions and orientations of that mounting plate in front of and below a work surface.

It will be appreciated that modifications of the presently-preferred embodiment described above may be made by those skilled in the art. Accordingly, this invention should be taken to be defined by the appended claims.

What is claimed is:

1. An adjustable keyboard support comprising a rear housing for pivotally supporting one end of a parallel link mechanism, a front housing carried by the other end of said parallel link mechanism and pivotally supporting a keyboard mounting plate said keyboard mounting plate having resilient bumpers mounted on said keyboard mounting plate adapted to clamp a keyboard to permit the keyboard mounting plate to securely mount different size keyboards, said parallel link mechanism permitting upward and downward movement of said keyboard mounting plate to any position desired by an operator without change in the tilt of the keyboard plate, and a gas cylinder mechanism coupled to said front housing for changing the vertical position of said keyboard plate.

2. An adjustable keyboard support as in claim 1, in which said rear housing is carried by a slide plate adapted to be mounted on the underside of a work surface for sliding movement with respect thereto.

3. An adjustable keyboard support as in claim 2, in which said rear housing is pivotally carried by said slide plate for at least about 180° of movement about a first axis generally perpendicular to said slide plate.

4. An adjustable keyboard support as in claim 3, in which said front housing pivotally supports said keyboard mounting plate for at least about 90° of movement about a second axis generally parallel to said first axis.

5. An adjustable keyboard support as in claim 4, including a tilt adjustment mechanism mounting said keyboard mounting plate to said front housing and permitting adjustment of the tilt of said keyboard mounting plate.

6. An adjustable keyboard support as in claim 2, in which said slide plate includes bearing blocks at the sides thereof, and a slide track on each side of said slide plate carrying said bearing blocks for sliding movement therein, and bearing blocks being spring-loaded against said slide tracks.

7. An adjustable keyboard support comprising a rear housing for pivotally supporting one end of a parallel link mechanism, a front housing carried by the other end of said parallel link mechanism and pivotally supporting a keyboard mounting plate said keyboard mounting plate having at least one raised edge and having a clamping means adapted to clamp at least two opposite ends of a keyboard to permit the keyboard mounting plate to securely mount different size keyboards, said parallel link mechanism permitting upward and downward movement of said keyboard mounting plate to any position desired by an operator without change in the tilt of the keyboard plate, and a gas cylinder mechanism coupled to said front housing for changing the vertical position of said keyboard plate.

8. An adjustable keyboard support comprising a rear housing for pivotally supporting one end of a parallel link mechanism, a front housing carried by the other end of said parallel link mechanism and pivotally supporting a keyboard mounting plate said keyboard mounting plate having at least one raised edge and having a clamping means adapted to clamp at least two opposite ends of a keyboard to permit the keyboard mounting plate to securely mount different size keyboards, said parallel link mechanism permitting upward and downward movement of said keyboard mounting plate to any position desired by an operator without change in the tilt of the keyboard mounting plate, said keyboard mounting plate having a tilt adjustment mechanism permitting adjustment of the tilt of said keyboard mounting plate and a gas cylinder mechanism coupled to said front housing for changing the vertical position of said keyboard mounting plate.

9. An adjustable keyboard support according to claim 8 wherein said parallel link mechanism is capable of 360° pivotal movement about the rear housing.

10. An adjustable keyboard support according to claim 8 wherein said keyboard mounting plate is capable of 360° pivotal movement.

* * * * *